Patented Oct. 26, 1926.

1,604,316

UNITED STATES PATENT OFFICE.

HENRY L. PRESTHOLDT, OF MINNEAPOLIS, MINNESOTA.

CASEIN GLUE.

No Drawing. Application filed April 17, 1922. Serial No. 554,205.

My present invention provides a new composition of matter, herein designated as "casein glue", but which, from its broader aspect, is an adhesive composition adapted to be used, by itself or commingled with other substances, as an adhesive coating.

This composition involves, as its most important elements, casein, lime and a salt of formic acid, preferably sodium formate. This composition is greatly improved by the addition of other substances, such as sodium fluoride, sodium sulphite, magnesium oxide, zinc oxide and an oil, preferably kerosene. The lime used is advisably calcium hydroxide or slacked lime.

I have obtained a very highly efficient glue or adhesive by the use of the above noted substances in accordance with the following formula:

| | Parts. |
|---|---|
| Casein | 50 to 75 |
| Calcium hydroxide | 10 to 22 |
| Sodium fluoride | 2 to 10 |
| Sodium sulphite | 3 to 8 |
| Magnesium oxide | 5 to 14 |
| Zinc oxide | 1 to 4 |
| Sodium formate | ½ to 3 |
| Kerosene | 3 to 5 |

Zinc oxide delays or retards the formation of ammonia, which tends to form in the glue emulsion, and prevents staining, so that no stains will be produced by the reaction of the alkali and salts in combination with gallic and tannic acid present in the woods. Magnesium oxide, found in combination with calcium oxide, sodium formate and sodium fluoride, is a solvent for casein and increases the colloidal strength and adhesive qualities of the glue.

The above noted substances, except the oil, are commingled in dry powdered form and the oil commingled therewith is in such small quantity that it does not make the powdered mass pasty but keeps the same from getting into dust form. The adhesive composition is sold in dry powdered form and when it is to be used, it will be introduced into water to form an emulsion, and it is then, of course, the chemical reactions that develop the adhesive qualities of the composition, will take place. After these reactions have taken place, the emulsion is adapted to be used as a glue or as a coating or to be commingled with other substances, such as paint or calcimine, which contain certain color pigments. When desired, however, the color pigments may be commingled with the dry composition. When the composition is to be used simply as a glue, no additions to the formula given, except water, will be required.

Casein, having colloidal properties, when treated with the chemicals used in this formula, produces adhesive qualities very valuable for gluing of wood. I use calcium hydroxide, which is a slack lime but must be what is commonly known as a high grade calcium lime. Sodium sulphite and sodium fluoride are utilized as a solvent, but either of these will not dissolve casein unless calcium hydroxide, in the proportion stated, is used. This mixture, however, has a tendency of becoming very liquid and losing its waterproof qualities, and for that reason, a small addition of magnesium oxide is introduced, which imparts to the glue emulsion the necessary waterproof qualities. Zinc oxide is introduced for the purpose of adding additional body to the glue and also to impart a white color, so that in the event of the glue penetrating the pores of the wood, the glue will not show to the disadvantage when the wood is finished. Zinc oxide has another peculiar property of retarding the formation of ammonia. This glue emulsion, by uniting with the gallic and tannic acid in the wood, forms a stain unless the zinc oxide is introduced. I use sodium formate as a re-agent for the purpose of preventing the decomposition and formation of nitrogen. Zinc oxide adds to the body of the glue and has a bleaching action, but may be omitted where a bleached glue or a glue that would produce stain is not required. Kerosene is desirable especially because it keeps down the dust in the process of manufacture, but may be omitted.

What I claim is:

1. An adhesive composition made substantially in accordance with the following formula:

| | Parts. |
|---|---|
| Casein | 50 to 75 |
| Calcium hydroxide | 10 to 22 |
| Sodium fluoride | 2 to 10 |
| Sodium sulphite | 3 to 8 |
| Magnesium oxide | 5 to 14 |
| Sodium formate | ½ to 3 |

2. An adhesive composition made in accordance with the following formula:

| | Parts. |
|---|---|
| Casein | 50 to 75 |
| Calcium hydroxide | 10 to 22 |
| Sodium fluoride | 2 to 10 |
| Sodium sulphite | 3 to 8 |
| Magnesium oxide | 5 to 14 |
| Zinc oxide | 1 to 4 |
| Sodium formate | ½ to 3 |
| Kerosene | 3 to 5 |

In testimony whereof I affix my signature.

HENRY L. PRESTHOLDT.